United States Patent

Umaki et al.

[11] Patent Number: 5,181,961
[45] Date of Patent: Jan. 26, 1993

[54] CEMENT COMPOSITION

[75] Inventors: Yasuhide Umaki, Funabashi; Rokuro Tomita, Urawa; Fumiaki Hondo; Shigeru Okada, both of Kyoto, all of Japan

[73] Assignees: Nihon Cement Co., Ltd., Tokyo; Sanyo Chemical Industries, Ltd., Kyoto, both of Japan

[21] Appl. No.: 751,961

[22] Filed: Aug. 29, 1991

Related U.S. Application Data

[63] Continuation-in-part of Ser. No. 646,734, Jan. 22, 1991, abandoned.

[30] Foreign Application Priority Data

May 22, 1989 [JP] Japan ................................. 1-129578

[51] Int. Cl.$^5$ ............................................. C04B 24/02
[52] U.S. Cl. ..................................... 106/724; 106/696; 106/708; 106/714; 106/823
[58] Field of Search ............... 106/719, 714, 708, 696, 106/724, 823

[56] References Cited

U.S. PATENT DOCUMENTS 4,547,223 10/1985 Goto et al. ........................... 106/711

FOREIGN PATENT DOCUMENTS 57-7852 1/1982 Japan .

*Primary Examiner*—Mark L. Bell
*Assistant Examiner*—Deborah Jones
*Attorney, Agent, or Firm*—Oblon, Spivak, McClelland, Maier & Neustadt

[57] ABSTRACT

A low shrinkage cement composition containing at least one compound having the formula:

ROH wherein R is an alkyl group having about 4 to 6 carbon atoms or a cycloalkyl group having about 5 to 6 carbon atoms.

6 Claims, No Drawings

CEMENT COMPOSITION

This application is a CIP application of application Ser. No. 07/646,734 filed Jan. 22, 1991, now abandoned.

BACKGROUND OF THE INVENTION

1. Field of the Invention

The present invention relates to a cement composition which exhibits a reduced drying shrinkage and which has an air-entraining property which is less sensitive to environmental temperature.

2. Description of the Background

One of the major disadvantages of conventional cement, mortar and concrete is the tendency thereof to crack on drying due to the considerable drying shrinkage of the same.

To reduce such drying shrinkage, various admixtures, such as alcohol alkylene oxide adducts and alkylphenol alkylene oxide adducts as described in Japanese Patent Laid-Open No. 37259/1981 and Japanese Patent Publication No. 10947/1987, have been proposed.

However, these alkylene oxide adducts must be used in a large amount due to their limited performance and which is, therefore, quite expensive. Further, the air-entraining property of such adducts is affected by environmental temperature, which makes it difficult to prepare a mixture containing a prescribed amount of air content.

Hence, a need continues to exist for a cement composition whose air-entraining property is less sensitive to environmental temperature, and whose drying shrinkage is reduced to a low level. Additionally, a need also continues to exist for an inexpensive cement composition.

SUMMARY OF THE INVENTION

Accordingly, it is an object of the present invention to provide a cement composition having an air-entraining property having a reduced sensitivity to environmental temperature.

It is also an object of the present invention to provide a cement composition having a reduced drying shrinkage.

It is, moreover, an object of the present invention to provide a cement composition which is inexpensive.

The above objects and others which will become apparent in view of the following disclosure are provided by a low-shrinkage cement composition containing at least one compound of the formula:

ROH wherein R is an alkyl group having about 4 to 6 carbon atoms or a cycloalkyl group having about 5 to 6 carbon atoms.

DETAILED DESCRIPTION OF THE PREFERRED EMBODIMENTS

The composition of the present invention contains cement and at least one compound represented by the formula:

ROH wherein R is an alkyl group having 4 to 6 carbon atoms or a cycloalkyl group having 5 to 6 carbon atoms. The present invention also provides a composition which contains cement, the above-mentioned compounds and a water-reducing agent for cement. The compound of the formula ROH is hereinafter referred to as a shrinkage-reducing agent.

In the above formula, typical examples of the alkyl group represented by R include n-butyl, iso-butyl, tert-butyl, n-pentyl, iso-pentyl, 1,2-dimethyl butyl, 1,3-dimethyl butyl, 2,2-dimethyl propyl, tert-pentyl, n-hexyl, iso-hexyl, 2-methyl pentyl, 3-methyl pentyl, 4-methyl pentyl, 2,2-dimethyl butyl, 3,3-dimethyl butyl and 2,3-dimethyl butyl; and typical examples of the cycloalkyl group represented by R include cyclopentyl, cyclohexyl and methyl cyclohexyl. Among these groups, the most preferred group is a butyl group having 4 carbon atoms.

Accordingly, typical examples of the alcohol represented by the formula (1) include n-butyl, iso-butyl, tert-butyl, n-pentyl, iso-pentyl, 1,2-dimethyl butyl, 1,3-dimethyl butyl, 2,2-dimethyl propyl, tert-pentyl, n-hexyl, iso-hexyl, 2-methyl pentyl, 3-methyl pentyl, 4-methyl pentyl, 2,2-dimethyl butyl, 3,3-dimethyl butyl, 2,3-dimethyl butyl, cyclopentyl, cyclohexyl and methyl cyclohexyl alcohol. These alcohols may be used singly or with two or more in combination.

Examples of cement suitable for the present invention include ordinary portland cement (type I), special portland cement (high early strength portland cement and moderate heat portland cement), portland blast furnace slag cement, portland fly ash cement, and high aluminous cement, for example.

The composition of this invention has advantageous effects, as previously mentioned, even if containing further water-reducing agent.

Examples of water-reducing agents suitable for the invention are lignin sulfonic acid, hydroxycarboxylic acid, condensates of naphthalene sulfonic acid with formalin, polycarboxylic acid and their salts(metal salts, amine salts). A typical example of a lignin sulfonic water-reducing agent is Pozzolith No. 70 (manufactured by Nisso Master Builders Co., Ltd. in Japan). A typical example of a hydroxycarboxylic water-reducing agent is Palic SR (manufactured by Fujisawa Pharmaceutical Co., Ltd. in Japan and Vinsol 80 (manufactured by Yamaso Chemical Co., Ltd. in Japan). A typical example of condensates of naphthalene sulfonic acid with formalin for a water-reducing agent is Sanyo Levelon (manufactured by Sanyo Chemical Industries, Ltd. in Japan). A typical example of a polycarboxylic water-reducing agent is Work 500P (manufactured by Nippon Zeon Co., Ltd. in Japan).

In the preparation of a cement composition of the invention, aggregates such as gravel, sand, pumice and burned pearlite may be used according to the specific requirement. Further, a water-reducing agent, air-entraining agent, expansive agent, shrinkage-reducing agent other than the present invention, and other known admixtures for mortar or concrete may be jointly used.

Depending on the number of carbon atoms in the alkyl group of the compound represented by the formula (1), the amount of the shrinkage-reducing agent to be used in the cement composition of the invention is usually in the range of about 0.5–10 wt % (preferably about 1.5–5 wt %) of cement. If the amount is less than about 0.5 wt %, the shrinkage-reducing effect is too small. On the contrary, the use in an amount of more than about 10 wt % is unpractical because the strength of the concrete after hardening will be reduced to about two thirds of the strength of a concrete containing no shrinkage-reducing agent.

The amount of water to be added according to the invention is not critical as long as it is sufficient to effect hydration, and the water/cement ratio is usually about 25-90 wt %, preferably about 30-70 wt %.

The amount of the water-reducing agent to be added according to the invention is usually in the range of 0-5 wt %, preferably about 0.05-5 wt % in terms of the water-reducing agent/cement ratio.

The amount of aggregate in terms of cement/aggregate ratio is usually in the range of about 10-200 wt %, preferably about 15-100 wt %.

Examples of known additives for mortar and concrete include hardening accelerators such as metal chlorides (e.g. calcium chloride) or organic amines (e.g. triethanol amine), hardening retarders such as saccharides, starches, cellulose and glycerol corrosion inhibitors for reinforcing-steel such as sodium sulfate and calcium nitrite. The amount of such an optional additive added to cement is usually about 0.1-5 wt %.

The shrinkage-reducing agent to be used in the cement composition of the present invention may be added to cement in the same manner as conventional cement additives. For example, when the cement composition is a mixture of cement and the shrinkage-reducing agent, the shrinkage-reducing agent is sprayed onto and mixed with the cement under stirring. When the cement composition is a cement paste, the cement composition prepared by the above process is mixed with water, or a prescribed amount of the shrinkage-reducing agent is first dissolved in water and then the solution is mixed with cement. If the cement composition is a mortar or concrete, a composition of the shrinkage-reducing agent and water is first prepared and then it is mixed with cement and aggregate, or a given amount of the shrinkage-reducing agent is added to a mixture of cement, water and aggregate while they are being stirred. Further, the shrinkage-reducing agent may be made to permeate into a hardened cement product through its surface. Thus, it is important to use a method which allows for a prescribed amount of the shrinkage-reducing agent to disperse uniformly in a cement composition in order to prepare a desired mortar or concrete mixture.

The manner of adding the water-reducing agent of the present invention to the cement composition may be the same as ordinary cement additives. For example, the water-reducing agent is admixed with a suitable proportion of water and then this composition is mixed with cement and aggregate, or admixed with the mixture composing cement, aggregate and water when admixed with them.

The cement composition may be cured using any of the atmospheric, wet air, water, and/or heat-accelerated (steam, autoclave, etc.) curing techniques. If desired, two or more such techniques may be combined. The respective curing conditions may be the same as in conventional ones.

The cement composition of the present invention has an air-entraining having a reduced sensitive to temperature and has a property and substantially improved or reduced drying shrinkage, even if the composition contains the water-reducing agent, as compared to using no shrinkage-reducing agent or to using a conventional shrinkage-reducing agent, such as polyoxyalkylene alkylether. Moreover, the cement composition of the present invention will hardly decrease the incombustibility of concrete and, even when added in a large amount (e.g., several percent), it will not materially reduce the strength of hardened concrete. Because the present invention allows a mass-produced chemical substance to be used without further processing as a shrinkage-reducing agent, a concrete admixture is provided which is capable of reducing the drying shrinkage substantially in an inexpensive manner. This is very advantageous.

The present invention will now be further described by reference to certain examples, which are provided solely for purposes of illustration and ar not intended to be limitative.

EXAMPLES 1-5, Comparison 1

(1) Five mortar samples were prepared using the shrinkage-reducing agents listed in Table 1 with a dosage of 2% by weight of cement, a plain mortar sample was also prepared for comparison. The resulting mortar samples were tested for drying shrinkage in conformity with the method of Japanese Industrial Standard A-1129 (the dial gauge method), for the amount of air content in conformity with JIS A-1116 and for the strength in conformity with JIS R-5201. The results are summarized in Table 1.

In the preparation of these samples, the water/cement ratio was 65 wt %, and the sand/cement ratio was 200 wt %. Standard Toyoura sand (particle size: 105-297 μm) was used. The mortar samples were molded in accordance with respective testing methods and then subjected to a 24-hour wet air curing (100% relative humidity) followed by a 7-day water curing. The cured samples were allowed to stand in an atmosphere of 50% relative humidity until the prescribed age was reached and were then subjected to the measurement. The temperature was kept at 20° C. through the total period of curing and drying.

TABLE 1

| | Shrinkage-reducing agent | Drying shrinkage ($\times 10^{-4}$) | | Air content (%) | 28 days strength (kgf/cm$^2$) | |
|---|---|---|---|---|---|---|
| | | After 28 days drying | After 91 days drying | | Bend. str. | Comp. str. |
| Example | | | | | | |
| 1 | n-Butanol | 5.1 | 6.3 | 1.7 | 74.0 | 410 |
| 2 | iso-Butanol | 5.3 | 6.5 | 1.7 | 73.8 | 405 |
| 3 | tert-Butanol | 5.2 | 6.5 | 1.6 | 73.5 | 415 |
| 4 | n-Pentyl alcohol | 5.5 | 6.6 | 1.8 | 74.2 | 401 |
| 5 | Cyclohexanol | 5.6 | 6.6 | 1.7 | 73.9 | 405 |
| Comparison 1 | Not added | 11.2 | 13.3 | 1.8 | 74.0 | 417 |

It is apparent from Table 1 that the mortars according to the present invention exhibit substantially improved drying shrinkage, even though the amount of air content therein, bending strength and compressive strength are on the same level with the mortar containing no shrinkage-reducing agent.

EXAMPLES 6-10, COMPARISONS 2-6

(2) The shrinkage-reducing agent used in Example 1 and a comparative one (the shrinkage-reducing agent described in the above-mentioned Japanese Patent Laid-Open No. 37259/1981) were respectively added to cement in amounts of 0.1, 0.5, 1.0, 2.0 and 4.0 wt %. The mortar samples thus obtained were tested for the drying shrinkage in the same manner as in Example 1. The test results are shown in Table 2.

TABLE 2

| | Shrinkage-reducing agent | Amount added (wt %) | Drying shrinkage ($\times 10^{-4}$) After drying for 91 days |
|---|---|---|---|
| Example | | | |
| 6 | n-C$_4$H$_9$OH | 0.1 | 10.5 |
| 7 | | 0.5 | 8.1 |
| 8 | | 1.0 | 6.9 |
| 9 | | 2.0 | 6.3 |
| 10 | | 4.0 | 6.0 |
| Comparison | | | |
| 2 | CH$_3$O(C$_2$H$_4$O)$_3$H | 0.1 | 12.5 |
| 3 | | 0.5 | 9.4 |
| 4 | | 1.0 | 7.9 |
| 5 | | 2.0 | 7.1 |
| 6 | | 4.0 | 6.3 |

As seen in Table 2, the drying shrinkage of the mortar according to the present invention are substantially smaller than that of the comparison over all the levels of the admixture addition.

EXAMPLE 11, COMPARISON 7

(3) Concrete mixtures having the mix design shown in Table 3 were prepared in accordance with JIS A-1138, at three different temperatures (these were mixed up at temperatures of 10° C., 20° C. and 30° C.). As the shrinkage-reducing agent, tertbutanol was used in Example 11, and a propylene oxide and ethylene oxide adduct of n-butanol was used in Comparison 7.

Then, the amount of air content and slump were tested on them. The results thus obtained are given in Table 4. The following materials were used to prepare the concrete mixtures.

| Materials used | |
|---|---|
| Cement | ordinary portland cement (Type I) made by Nihon Cement Co., Ltd. |
| Fine aggregate | river sand from the Fuji River |
| Coarse aggregate | crushed stone from Ohme |
| AE water-reducing agent | Pozzolith No. 70 made by Nisso Master Builders Co., Ltd. |
| AE assistant | Pozzolith No. 303A made by Nisso Master Builders Co., Ltd. |

TABLE 3

| Water/cement ratio (%) | | 55 |
|---|---|---|
| Fine aggregate percentage (%) | | 46 |
| Unit content (kg/m$^3$) | Cement | 300 |
| | Shrinkage-reducing agent | 7.5 (See note 1) |

TABLE 3-continued

| Water | 165 |
|---|---|
| Fine aggregate | 837 |
| Coarse aggregate | 1002 |
| AE Water-reducing agent | 0.75 (See note 2) |
| AE Assistant | 0.012 |

Note 1: 2.5 wt % of cement,
Note 2: 0.25 wt % of cement

TABLE 4

| | Shrinkage-reducing agent | Slump (cm) | Properties of fresh concrete Amount of air content (%) | Mixed up tem. (°C.) |
|---|---|---|---|---|
| Example 11 | tert-C$_4$H$_9$OH | 10.8 | 4.7 | 10.2 |
| | | 11.5 | 4.9 | 21.1 |
| | | 11.6 | 4.8 | 30.1 |
| Comparison 8 | n-C$_4$H$_9$O(C$_3$H$_6$O)$_2$—(C$_2$H$_4$O)$_2$H | 12.5 | 6.8 | 10.2 |
| | | 10.5 | 4.1 | 21.1 |
| | | 9.0 | 1.8 | 30.1 |

As shown in Table 4, the air-entraining property and slump of the cement composition of the present invention are less sensitive to environmental temperature (temperature when they were mixed).

EXAMPLES 12–16, Comparisons 8–12

(4) Concrete mixtures having the mix design shown in Table 5 were prepared in accordance with JIS A-1138, with or without tert-butanol as a shrinkage-reducing agent.

Then, the amount of air content and slump were tested on them. The drying shrinkage property was tested in conformity with the method of JIS A-1129. The results thus obtained are given in Table 6. The following materials were used to prepare the concrete mixtures.

| Materials used | |
|---|---|
| | ordinary portland cement (Type I) made by Nihon Cement Co., Ltd. |
| Fine aggregate | river sand from the Fuji River |
| Coarse aggregate | crushed stone from Ohme |
| AE water-reducing agent | Pozzolith No. 70 made by Nisso Master Builders Co., Ltd. Palic SR made by Fujisawa Pharmaceutical Co., Ltd. Vinsol 80 made by Yamaso Chemical Co., Ltd. Sanyo Revelon made by Sanyo Chemical Industries, Ltd. Work 500P made by Nippon Zeon Co., Ltd. |

TABLE 5

| | | Example | | | | | Comparison | | | | |
|---|---|---|---|---|---|---|---|---|---|---|---|
| | | 12 | 13 | 14 | 15 | 16 | 8 | 9 | 10 | 11 | 12 |
| AE water-reducing agent | | Pozzolith No. 70 | Palic SR | Vinsol 80 | Sanyo Levelon | Work 500P | Pozzolith No. 70 | Palic SR | Vinsol 80 | Sanyo Levelon | Work 500P |
| Water/cement ratio (%) | | 55 | 55 | 55 | 42 | 56 | 55 | 55 | 55 | 42 | 56 |
| Fine aggregate percentage (%) | | 46 | 46 | 46 | 44 | 46 | 46 | 46 | 46 | 44 | 46 |
| Unit content (kg/m$^3$) | Cement | 300 | 300 | 300 | 400 | 320 | 300 | 300 | 300 | 400 | 320 |
| | Water | 165 | 165 | 165 | 168 | 179 | 165 | 165 | 165 | 168 | 179 |
| | Fine aggregate | 837 | 837 | 837 | 838 | 894 | 837 | 837 | 837 | 838 | 894 |
| | Coarse aggregate | 1002 | 1002 | 1002 | 1066 | 1049 | 1002 | 1002 | 1002 | 1066 | 1049 |
| | t-Butanol | 7.5 | 7.5 | 7.5 | 7.5 | 7.5 | 0 | 0 | 0 | 0 | 0 |

TABLE 5-continued

| | Example | | | | | Comparison | | | | |
|---|---|---|---|---|---|---|---|---|---|---|
| | 12 | 13 | 14 | 15 | 16 | 8 | 9 | 10 | 11 | 12 |
| AE water-reducing agent | 0.75 | 2.1 | 3.3 | 4.0 | 1.6 | 0.75 | 3.0 | 2.1 | 4.0 | 1.6 |

TABLE 6

| | Water reducing agent | Shrinkage-reducing agent | Slump (cm) | Amount of air content (%) | Drying shrinkage ($\times 10^{-4}$) After drying for 14 days |
|---|---|---|---|---|---|
| Example | | | | | |
| 12 | Pozzolith 70 | tert-$C_4H_9OH$ | 11.0 | 5.0 | 1.4 |
| 13 | Palic SR | | 13.5 | 6.0 | 1.0 |
| 14 | Vinsol 80 | | 10.0 | 4.7 | 1.5 |
| 15 | Sanyo Levelon | | 8.5 | 2.1 | 1.8 |
| 16 | Work 500P | | 20.0 | 4.9 | 1.6 |
| Comparison | | | | | |
| 8 | Pozzolith 70 | Not added | 10.5 | 4.9 | 3.8 |
| 9 | Palic SR | | 13.0 | 4.7 | 2.4 |
| 10 | Vinsol 80 | | 11.5 | 4.2 | 4.1 |
| 11 | Sanyo Levelon | | 6.0 | 1.8 | 4.0 |
| 12 | Work 500P | | 18.5 | 4.0 | 4.0 |

It is apparent from Table 6 that the mortars according to the invention exhibit a substantially improved or reduced drying shrinkage, in comparison with the mortar containing no shrinkage-reducing agent.

Having described the present invention, it will now be apparent to one of ordinary skill in the art that many changes and modifications may be made to the above-described embodiments without departing from the spirit and the scope of the present invention.

What is claimed as new and desired to be secured by Letters Patent of the United State is:

1. A low shrinkage cement composition, comprising cement, from about 0.5 to 10 wt. %, based on the weight of cement, of at least one compound having the formula:

ROH wherein R is an alkyl group having about 4 to 6 carbon atoms or a cycloalkyl group having about 5 to 6 carbon atoms, from about 0.05 to 5 wt. %, based on the weight of cement, of a water-reducing agent and water in an amount sufficient to effect hydration.

2. The cement composition according to claim 1, wherein the compound represented by the formula is selected from the group consisting of n-butanol, iso-butanol and tert-butanol.

3. The cement composition according to claim 1, wherein the compound represented by the formula is tert-butanol.

4. The cement composition according to claim 1, wherein the cement is type I portland cement, high early strength portland cement, moderate heat portland cement, portland blast furnace slag cement, portland fly ash cement or high aluminous cement.

5. The cement composition according to claim 1, which further contains aggregates.

6. The cement composition according to claim 1, wherein the amount of the water is about 25-90% by weight of cement.

* * * * *